United States Patent
Reus

[11] 3,780,573
[45] Dec. 25, 1973

[54] UNIFORMITY TEST MACHINES
[75] Inventor: Walter Reus, Freigericht, Germany
[73] Assignee: Dunlop Limited, London, England
[22] Filed: Mar. 13, 1972
[21] Appl. No.: 234,419

[30] Foreign Application Priority Data
Mar. 22, 1971 Germany.................. P 21 13 820.5
Mar. 22, 1971 Germany.................. P 71 10 863.9

[52] U.S. Cl. .............................................. 73/146
[51] Int. Cl. ......................................... G01m 17/02
[58] Field of Search.................... 73/146, 462, 517 R

[56] References Cited
UNITED STATES PATENTS
3,206,973 9/1965 Obarski................................. 73/146
3,527,091 9/1970 Reus...................................... 73/146
3,693,425 9/1972 Starita et al........................ 73/517 R Primary Examiner—Donald O. Woodiel
Attorney—Richard K. Stevens et al.

[57] ABSTRACT

Apparatus and a method for determining wheel/tire uniformity in which the wheel is rotatably mounted on one end of a support shaft and rotated under load against a moving surface. The support shaft is clamped in two spaced apart force-measuring devices each being sensitive in at least two directions which are perpendicular to one another and to the support shaft.

17 Claims, 5 Drawing Figures

UNIFORMITY TEST MACHINES

The invention relates to an apparatus for determining the uniformity of wheels, more especially of vehicle tires at fairly high speeds, by means of devices for measuring the forces and moments which occur on a loaded wheel which is rolling on a moving surface.

The more the tires are integrated into the chassis as structural elements to improve safety of driving and comfort of driving, the greater become the demands on the tires and it becomes all the more important to have available devices for measuring the properties of tires, especially at high speeds. In this connection, the measuring of the uniformity or conformity of tires is of special significance, and various machines are already known for measuring the uniformity of tires or the like. In these machines the tire that is to be tested is mounted on a wheel pivoted on the intermediate frame which is connected to a fixed frame via force measuring devices which are arranged at an angle to one another, in order to determine various directional components of the forces acting on the tires. However, such devices have the disadvantage that, through a redundancy in determination of the suspension of the intermediate frame, bracing forces can occur which can falsify the measuring results.

In another machine which has been proposed for measuring the uniformity of wheels, especially for measuring the lateral forces in the case of tires fitted onto a rim, the pivoted and loaded wheel rolls on a revolving running drum and to enable the various forces on the wheel to be measured the wheel is pivoted on one end of a measuring beam which is arranged parallel to the running drum axis and which is slewably suspended from the other end, the force exerted on the measuring beam in the axial direction of the wheel being measured by a suitable force measuring device.

This machine does have the advantage that the measuring beam acting on the force measuring device is statically clearly determined and, by a simple swinging of the measuring beam about its pivot axis, the wheel that is to be tested can be raised from the running drum and be changed. The machine is not suitable however, for carrying out uniformity measuring at fairly high speeds owing to resonance, and is constructionally relatively expensive.

According to the invention there is provided apparatus for determining uniformity of wheels particularly vehicle tires mounted on wheel rims, comprising a support shaft on one end of which said wheel is rotatably mounted, and a movable surface against which, in use of the apparatus, the wheel is pressed, the shaft being clamped in two spaced-apart force measuring devices each being sensitive in at least two directions which are perpendicular to one another and to the support shaft, means being provided for moving said surface against the loaded wheel. Preferably the output signals of the two force measuring devices are fed to a calculating unit which effects a separation of the forces and moments in accordance with the direction thereof and which is connected to indicating and/or recording instruments.

With the apparatus in accordance with the invention, a resonant frequency of the apparatus > 150 hz may be achieved so that uniformity measurements may readily be undertaken on tires up to speeds of approximately 150 km/h, i.e. to about 20 revolutions per second. This may be achieved because the secondary mass of the measuring system may be kept small and in the force measuring devices spring elements can be used which allow only a very small deformation under the forces being measured and thus inherent frequencies up to ten times the value of the basic frequency can be obtained.

Preferably, one of the two force measuring devices responds to forces in the direction of the support shaft so that it can measure the side-forces generated by the rolling wheel. In this way, resistance to rolling, radial force, lateral force, camber moment and restoring moment can be ascertained by means of the two force measuring devices.

Preferably the separation of the forces is effected in the calculating unit by summation. This allows the use of simple and commerical sub-assemblies in the calculating unit.

Preferably, the distance from the wheel to the force measuring device which can measure the side force exerted by the wheel is selected as small as possible. Furthermore, the mutual spacing of the two force measuring devices is advantageously chosen as a function of the desired inherent frequency of the measuring device. With sufficiently high inherent frequency, a measuring device having comparatively small dimensions can be constructed which can also readily be attached to a motor vehicle in order to measure the forces on the wheel under driving conditions.

In a further advantageous embodiment of the invention means for the division and representation of the measured values, separated according to directions, for the forces and moments into static and dynamic portions are provided.

This division into a static and a dynamic portion, which is practically the same as a separation between the direct-current portion and the superimposed alternating-current portion, makes possible the determination of radial force fluctuation, resistance to rolling fluctuation, lateral force fluctuation, camber moment fluctuation, and restoring moment fluctuation. Another advantage emerging from this is that, by use of the measured signals for the radial force fluctuation and the camber moment, the wheel can be precisely balanced statically and dynamically, which is important at high speeds, since otherwise signals originating from the imbalance are superimposed on the measured values.

The force measuring devices preferably take the form of crosses having arms which are connected to measuring elements and which extend from a hub, which can be fastened on the support shaft, to a system-fast support. By means of such crosses it is possible to achieve an extensive separation of the forces standing perpendicular to one another already in the individual measuring devices.

Preferably at least one pair of diametrically opposed identical measuring arms is provided for each measuring direction.

The measuring cross also responding to forces in the direction of the support shaft may have additional measuring arms e.g. two pairs of measuring arms which are perpendicular to one another and which are arranged at 45° with regard to the other two pairs of measuring arms.

Preferably all the measuring arms are connected to the respectively system-fast support via yielding springs in such a way that the yielding springs are always rigid in the measuring direction on the pertinent measuring arm and pliant in the remaining directions.

Preferably each measuring arm is provided with measuring elements which preferably consist of strips fastened to the measuring arms and responsive to bending stresses. In this way, use is advantageously made of the fact that the sensitivity of a bending element is greater than that of an element loaded in push or pull.

At least four such measuring strips are advantageously mounted on the measuring arms which are provided for determining the forces in one direction, the four strips being electrically connected as full bridges. Through this arrangement of the measuring strips in a bridge circuit, length alterations of the measuring arms by virtue of temperature or other force influence enter only negligably into the signals obtained.

The measuring arms advantageously extend from the hub to a ring which can be fastened in a housing, and the yielding springs are arranged on the inside of the ring. This arrangement leads to the possibility of an extremely compact construction.

The yielding springs are advantageously obtained by formation of slots and recesses in the ring and by means of the cross-sectional dimensioning of the measuring arms.

In accordance with a further advantageous embodiment of the invention, the hubs of the two measuring crosses can be braced together on the axis. In this way, a particularly exact assembly of the device of the invention is ensured and a simple and again accurate incorporation into a housing for the reception of the measuring crosses is made possible.

The invention will now be described in more detail, by way of example only, with reference to the accompanying drawings, in which.

Figure 1:
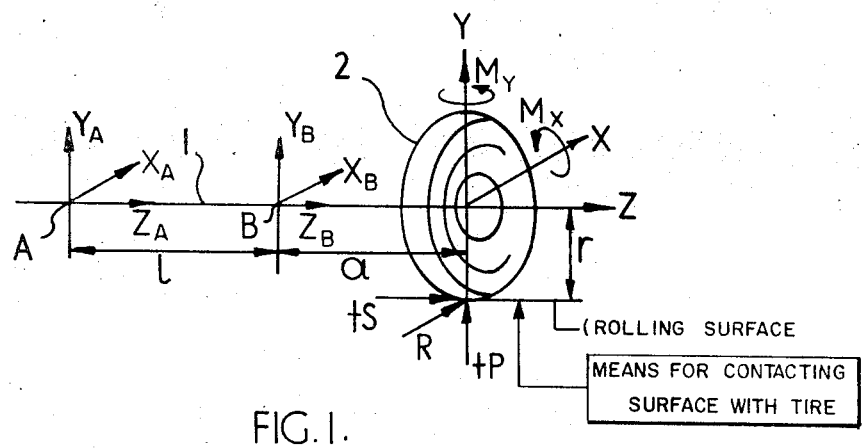
FIG. 1 shows a diagrammatic representation for illustrating the basic principle of the apparatus of the invention.

FIG. 1 shows, in a diagrammatic manner, a tire 2 which is fastened pivotally to a support shaft 1. The support shaft 1 is clamped in two supports A and B arranged at a mutual spacing $\iota$ and at a spacing with regard to the tire 2.

These supports A and B symbolize system-fast force measuring devices, i.e. ones fastened rigidly in a stationary housing.

These force measuring devices symbolized by the supports A and B are designed in such a way that they respond to forces in the directions X, Y and Z, perpendicular to one another, and in such a way that the signals corresponding to the forces acting in these directions are obtained separately.

The distance between the support B and the wheel clamping point amounts to $a$ so that the distance between the support A and the wheel clamping point amounts to $\iota + a$.

The forces and moments acting on the wheel 2 are indicated on FIG. 1 in the marked co-ordinate system, the origin of which coincides with the center of the wheel mounting.

In the co-ordinate system adopted a force corresponding to the resistance to rolling R, and the camber moment $M_x$, acts as in the X-co-ordinate, the radial force P and the restoring moment $M_y$ in the Y-co-ordinate and the lateral forces S in the Z-co-ordinate.

The mode of operation of the apparatus will now be explained by way of example with reference to the determining of the radial force P and the camber moment $M_x$.

It is assumed that, in the moving surface, the forces +P and +S are active. The direction of the force P passes through the origin of the co-ordinate system and accordingly generates a moment about the supports A and B.

By setting up a balance of moments, it emerges that in the co-ordinate $Y_A$ of the support A the force P $(a/L)$ takes effect and in the support B, the force $Y_B = -P(a + \iota/\iota)$ takes effect.

The lateral force S extends in the direction of the co-ordinate Z and can, consequently, be measured as $Z_A$ or $Z_B$ or $Z_A + Z_B$ of the supports A and B. Since the lateral force S, however, does not pass through the origin of the co-ordinate system of the wheel, it additionally generates a moment $M_x = S \cdot r$, in which connection $r$ represents the radius of the wheel 2.

This moment $M_x$ produces in the support A in accordance with the co-ordinate $Y_A$ a force of reaction $(+M_x/\iota)$, and in the support B a force of $(-M_x/\iota)$.

It is evident that the forces of reaction in the supports A and B are always composed of the two forces S and P. The following equations are obtained:

$$Y_z = P\ (a/\iota) + S\ (r/\iota)$$
$$Y_B = -P\ (a + \iota/\iota) - S\ (r/\iota)$$

The values of $a$ and $\iota$ are constant dimensions which can be selected suitably in the same way as the sensitivity of the force measuring devices.

The output signals corresponding to the above equations are fed to a calculating unit in which the necessary separation of forces and moments is undertaken by means of a sum operation.

If the values of $a$ and $\iota$ are selected so that $a = \iota$ there is obtained:

$$Y = Y_A + Y_B = (P + S\ [r/\iota]) + (-2P - S\ (r/\iota)) = -P$$

This force corresponding to the radial force can be indicated in a conventional manner in that the output summation signal is fed to a suitable indicating and/or recording instrument.

The value of the camber moment $M_x$ is likewise obtained by means of the sum operation $Y_A$ and $Y_B$, in which connection, however, the value of $Y_A$ is doubled, i.e. the output voltage corresponding to $Y_A$ has to be increased to double the value. Likewise, on the condition of $a = \iota$, there then emerges:

$$2\ Y_A + Y_B = 2\ (P + S\ [r/\iota]) + (-2P - S\ [r/\iota]) = (S \cdot r/\iota)$$
$$= M_x$$

It is obvious that the operations that are to be carried out in the calculating unit are of a very simple type and can be realized by means of summation amplifiers.

In the case of equalization of the summation amplifier for the force, the measuring system is loaded with a pure moment and the amplification in a branch is varied in such a way that the output signal becomes nil. In the case of equalization of the summation amplifier for the moment, a pure force is introduced and the amplification is altered in such a way that the force becomes nil. A direct quantity calibration can then be undertaken.

The measuring of the longitudinal force or the resistance to rolling $R$ and the restoring moment $M_y$ is effected by means of the components $X_A$ and $X_B$ in a similar way, since it is in this connection simply a question of a rotation of the system through 90°. However, it is to be observed that the restoring moment $M_y$ arises by virtue of the lateral force $S$ acting around the lag $n$ with regard to the co-ordinate origin, and the magnitude of $n$ takes the place of the value $r$ in the previous example.

It has already been mentioned that the lateral force $S$ can be obtained by way of example through the signal corresponding to $Z_B$.

Figure 2:
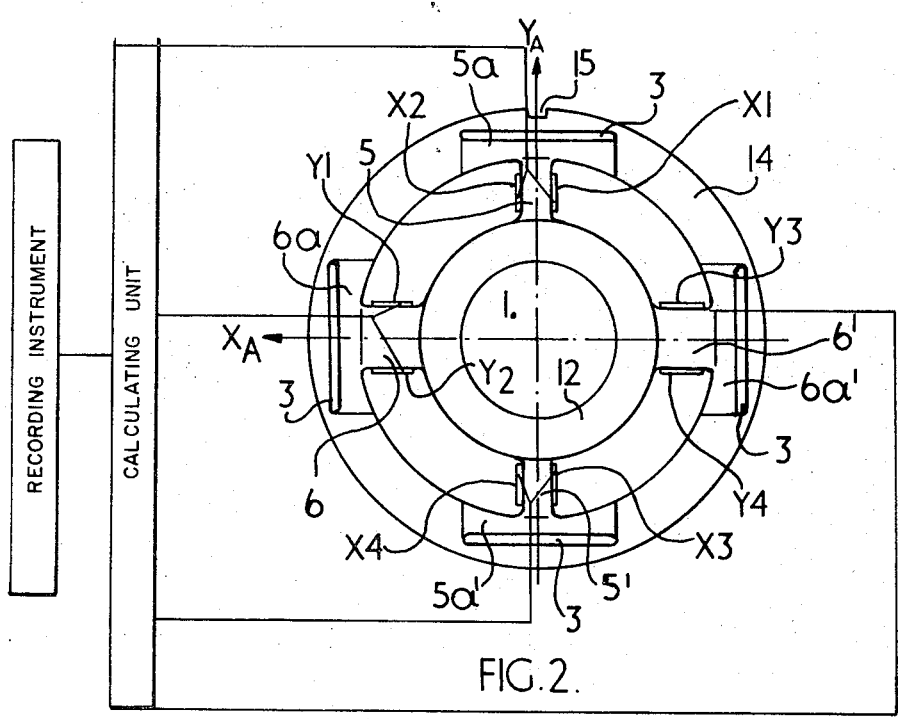
FIG. 2 shows a diagrammatic representation of a force measuring device, in the form of a measuring cross, for the determination of forces in two directions perpendicular to one another.

FIG. 2 shows a diagrammatic representation of a practical embodiment of a force measuring device as was indicated as support $A$ in FIG. 1.

This force measuring device consists of a hub 12, intended for the reception of the shaft 1, a ring 14 concentrically surrounding this hub at a spacing, and measuring arms 5, 5' and 6, 6' which form a measuring cross extending between hub 12 and ring 14. One pair of diametrically opposed, respectively identical measuring arms is provided for each measuring direction, i.e. in the represented case, for the X-direction and Y-direction. These measuring arms are fastened rigidly to the hub 12 and via yielding springs 5a, 5'a, 6a and 6'a to the ring 14.

These yielding springs, which are obtained by slots such as 3, and recesses in the ring and through cross-sectional dimensioning of the measuring arms, are selected in such a way that the yielding spring on the respective measuring arm is always rigid in the measuring direction and pliant in the other two directions.

Mounted as measuring elements on the measuring arms 5, 5' and 6, 6' are wire strain gauges, as is indicated diagrammatically by the measuring strips $X1$, $X2$ on the measuring arm 5, $X3$, $X4$ on the measuring arm 5', $Y1$, $Y2$ on the measuring arm 6 and $Y3$, $Y4$ on the measuring arm 6'.

If one considers, by way of example, the wire strain gauges $X1$ to $X4$ mounted on the measuring arms 5, 5', extending in the Y-direction, it is apparent that owing to the yielding springs 5a and 5'a only very slight length alterations in the measuring arms occur in the Y-direction and in the Z-direction standing perpendicular to the drawing plane, since the yielding springs are loaded in deflection, but in the X-direction (measuring direction) a high bending ensues and consequently a large output signal is produced, since the yielding springs are loaded in pressure.

In this way, a very good pre-separation of the forces according to the respective directions is ensured.

A similar consideration is also true for the measuring arms 6, 6' and the pertinent elements $Y1$ to $Y4$. In this case, only a slight deformation occurs in the X-direction and in the Z-direction, but in the Y-direction a high bending deflection occurs and, consequently, a large output signal is produced in the Y-direction.

It is essential that in all the co-ordinates the forces are measured as bending stresses on the corresponding measuring arms, since the sensitivity of a bending element is, as is known, greater than that of an element loaded in push or pull.

The four measuring elements provided for each measuring direction are connected into a full bridge, since deformations in elongations of the measuring arms by virtue of temperature change or by virtue of other acting forces in the case of such a bridge circuit enter only very slightly into the measurement result. In this connection it is furthermore advantageous that the measuring elements belonging to a full bridge lie very near to one another and in this way a stable zero point can be maintained. If necessary, even a common air cooling of the measuring elements can be provided.

FIG. 3 shows, again in diagrammatic representation, a measuring cross which corresponds to the support B in FIG. 1 and which, in contrast to the measuring cross shown in FIG. 2, responds not only in the X-direction but also in the Z-direction.

This measuring cross also consists of a hub 11, which serves for the reception of the support shaft 1, and a ring 13 concentric to the hub. Between the hub and the ring extend the arms 7, 7' corresponding to the Y-direction, arms 8, 8' corresponding to the X-direction and also two pairs of arms 9, 9' and 10, 10' which stand perpendicular to one another and which are rotated through 45° with regard to the arms responding to the forces in the X-direction and Y-direction.

Also in the case of this measuring cross responding to three directions, the individual measuring arms are fastened rigidly to the hub 11 and via yielding springs 7a, 7a', 8a, 8a', 9a, 9a', 10a and 10a', to the ring 13. The yielding springs are, again, designed in such a way that the yielding spring on the pertinent measuring arm is always rigid in the measuring direction and pliant in the two remaining directions.

Figure 3:
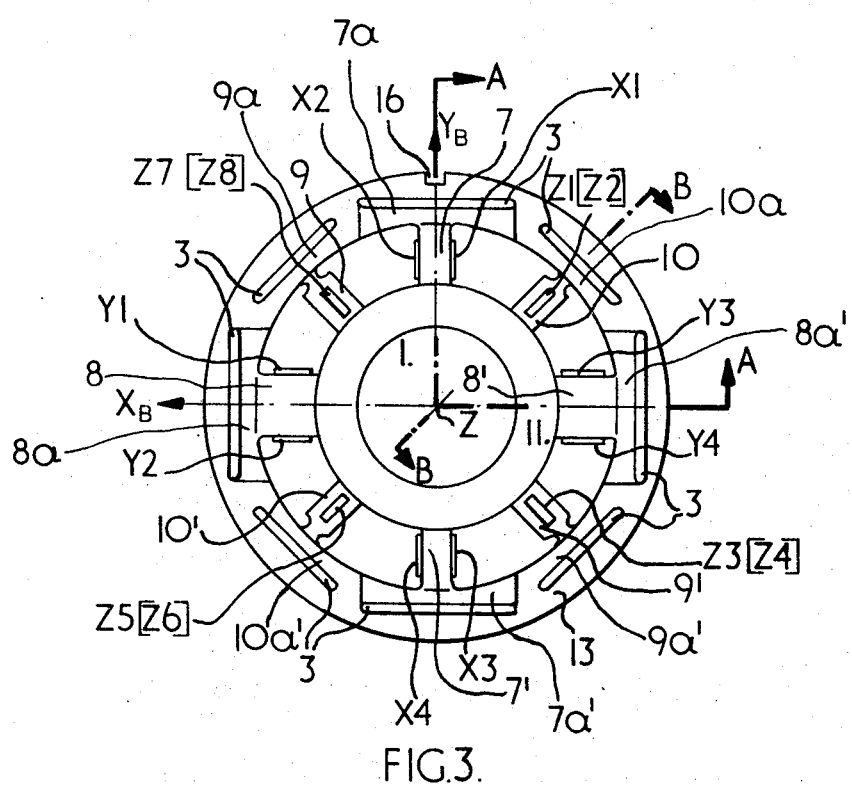
FIG. 3 shows a diagrammatic representation of a further force measuring device, designed as a measuring cross, for determining forces in three directions extending perpendicular to one another.

The arrangement of the measuring strips $X1$ – $X4$ and $Y1$ – $Y4$ corresponds, in the case of the measuring cross of FIG. 3, to the arrangement of these measuring strips in the case of the measuring cross according to FIG. 2.

Eight further measuring strips $Z1$ to $Z8$ are mounted on the four additional measuring arms 9, 9', 10, 10', intended for the measuring of the lateral force, and are connected as a full bridge. In this connection, the measuring strips arranged on the same sides of two diametrically opposed measuring arms lie respectively in a bridge branch.

The measuring strips $Z1$, $Z3$, $Z5$ and $Z7$ iindicated in brackets on FIG. 3 lie respectively in the drawing plane below the measuring strips $z_1$, $z_3$, $z_5$ and $z_7$.

To ensure correct positioning in the mounting of the two measuring crosses, aligning grooves 16 and 15 are provided in the rings 13 and 14 which at the same time make possible a positionally correct insertion of both measuring crosses into a suitable housing.

Figure 4:
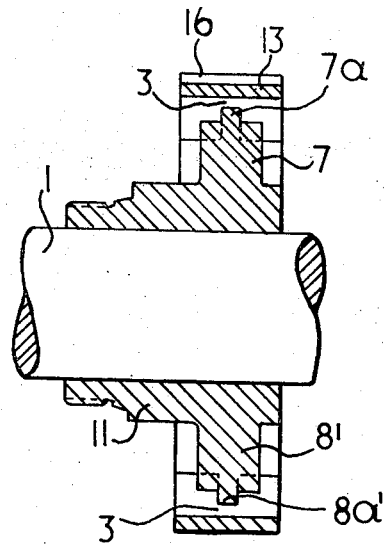
FIGS. 4 and 5 show sectional views taken on the lines A—A and B—B in FIG. 3.
Figure 5:
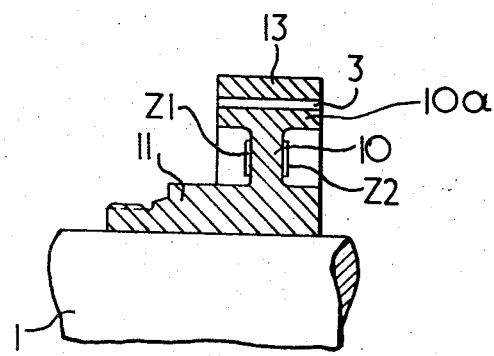

The sectional representation in FIGS. 4 and 5 show in detail the specific design of the yielding springs provided in the two measuring crosses, FIG. 4 showing details of the yielding springs for measuring arms in the X-direction and Y-direction and FIG. 5 showing details of the measuring arms responding to forces in the Z-direction. The slots, such as 3, extend perpendicular to the respective measuring arms and their spacing with regard to the external measuring arms is selected in accordance with the desired springiness properties. The same is true for the thickness of the yielding springs such as 7a and 8a', which is determined by the depth of recesses in the ring between the slots and the measuring arms, and for the depth of the recesses in the outer end of the measuring arms responding to forces in the Z-direction.

The two measuring crosses can be braced together, in suitable stops being provided in order to be able to observe exactly a given mutual spacing.

It is a significant advantage of the apparatus of this invention, that the longitudinal force fluctuations or resistance to rolling fluctuations occurring at high speeds can be precisely determined. Since the inherent frequencies of the apparatus in accordance with the invention lie for all the measured values at approximately 150 and 200 c/s (Hertz) measurements are possible at high speeds without disturbing resonance occurring, even under driving conditions, since the apparatus of the invention can be constructed extremely rigidly, compactly and in an extremely space-saving manner.

Having now described my invention, what I claim is:

1. Apparatus for determining uniformity of wheels particularly vehicle tires mounted on wheel rims comprising:
    a. a support shaft;
    b. a wheel rotatably mounted on one end of the support shaft;
    c. two force measuring devices, in which the support shaft is clamped, located adjacent to one another in spaced-apart relationship along the shaft, said devices being sensitive in at least two directions which are perpendicular to one another and to the support shaft;
    d. a movable surface against which the wheel is pressed; and
    e. means for moving the surface against the wheel.

2. Apparatus according to claim 1 including a calculating unit to which output signals from the two force measuring devices are led for separation of the forces and moments on said wheel in accordance with their direction, and an instrument for indicating such forces.

3. Apparatus according to claim 1, in which the force measuring devices comprise spring elements which allow only a very small deformation under the forces being measured.

4. Apparatus according to claim 1 in which at least one of the force measuring devices is sensitive to forces in the direction of the support shaft.

5. Apparatus according to claim 4 in which the one force measuring device measures the side force exerted by the wheel and is positioned as close to the wheel as possible.

6. Apparatus according to claim 5 in which the mutual spacing of the two force measuring devices is as a function of the inherent frequency of the measuring devices.

7. Apparatus according to claim 2 in which said calculating unit comprises means for the division and representation of the measured values, separated according to directions, of the forces and moments into static and dynamic portions.

8. Apparatus according to claim 1 in which the force measuring devices each comprise:
    a. a hub connected to said support shaft;
    b. a cross having measuring arms and extending from said hub; and
    c. a rigidly fixed support to which the extended end of said cross is connected.

9. Apparatus according to claim 8 in which at least one pair of diametrically opposed identical measuring arms is provided for each measuring direction.

10. Apparatus according to claim 9 in which said cross responds to forces in the direction of said support shaft and has two pairs of measuring arms which measure the forces in the direction of said support, said two pairs being arranged at 45° to measuring arms for each of the two other measuring directions.

11. Apparatus according to claim 8 in which all the measuring arms are connected to the rigidly fixed support via yielding springs, said yielding springs being rigid in the measuring direction on the pertinent measuring arm and pliant in the remaining directions.

12. Apparatus according to claim 11 further comprising a housing and a ring concentrically mounted about said hub, said measuring arms extending from said hub to said ring fastened in said housing, the yielding springs being arranged on the inside of said ring.

13. Apparatus according to claim 12 in which the yielding springs are obtained by formation of slots and recesses in the ring and by means of the cross-sectional dimensioning of the measuring arms.

14. Apparatus according to claim 8 in which each measuring arm is provided with measuring elements which comprise strips fastened to the measuring arms and responsive to bending stresses.

15. Apparatus according to claim 14 in which at least four measuring strips are mounted on the measuring arms provided for determining forces in one direction, the four strips being electrically connected as full bridges.

16. Apparatus according to claim 8 in which the hubs of the two crosses are braced together.

17. A method of determining the uniformity of wheels comprising rotatably mounting a wheel on one end of a support shaft, holding the support shaft by two spaced apart force measuring devices each responsive at least to forces generated in two directions perpendicular to one another and to the shaft, rotating said wheel under load against a movable surface and measuring the forces generated in said force measuring devices.

* * * * *